(No Model.)

J. W. STRONG.
CHUCK.

No. 339,120.  Patented Mar. 30, 1886.

Witnesses
S. S. Williamson
W. T. Haviland

Inventor
John W. Strong
By Smith & Hubbard
Attys

UNITED STATES PATENT OFFICE.

JOHN W. STRONG, OF BRIDGEPORT, CONNECTICUT.

CHUCK.

SPECIFICATION forming part of Letters Patent No. 339,120, dated March 30, 1886.

Application filed June 1, 1885. Serial No. 167,204. (No model.)

*To all whom it may concern:*

Be it known that I, JOHN W. STRONG, a citizen of the United States, residing at Bridgeport, in the county of Fairfield and State of Connecticut, have invented certain new and useful Improvements in Chucks; and I do hereby declare the following to be a full, clear, and exact description of the invention, such as will enable others skilled in the art to which it appertains to make and use the same.

My invention relates to certain new and useful improvements in chucks for holding work, having screw-threads, either male or female, and has for its object to provide such a device from which the work will be as readily removed as inserted, and without the use of any wrench or similar device; and with these ends in view my invention consists in certain details of construction and combination of elements hereinafter fully and in detail explained, and then specifically designated by the claims.

In order that those skilled in the art to which my invention appertains may understand its construction and operation, I will proceed to describe the same in detail, referring by letter to the accompanying drawings, forming a part of this specification, in which—

Figure 1:
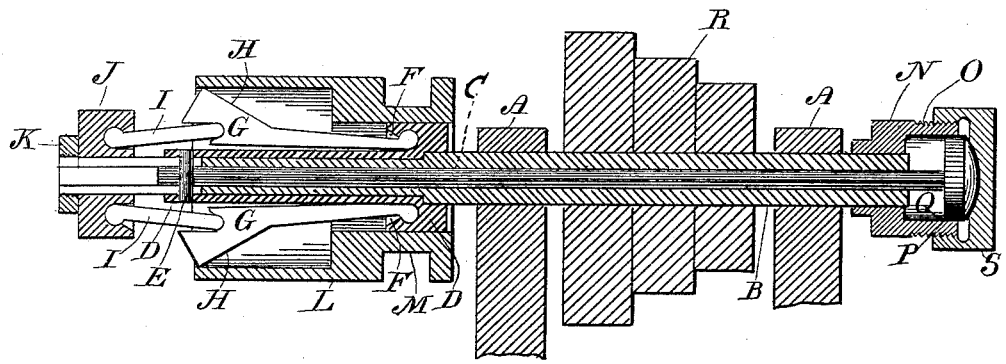
Figure 2:
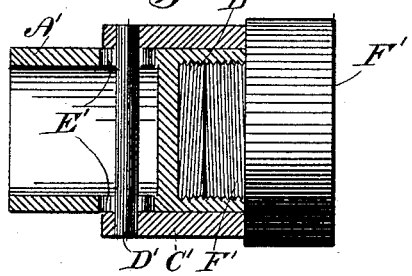

Figure 1 is a central longitudinal section of a spindle with my improvement secured thereon, and showing mechanism for operating the same; and Fig. 2 a central section of my improvement adapted to hold work having male threads.

Similar letters denote like parts in the several figures of the drawings.

A are standards, in which is journaled the spindle B in any suitable manner. This spindle is hollow throughout its entire length, and has a rod, C, passed through said hollow for the purpose presently explained.

D is a sleeve passed over the outer end of the spindle and connected to the rod C by means of a pin, E, which passes through a slot in the spindle, so that any longitudinal movement of the sleeve will be imparted to the rod. The sleeve D has a head formed on its inner end, in which are formed recesses F, adapted to receive and retain the inner ends of the toggle-levers G. The outer ends of these levers G are beveled at H, and also adapted to receive the inner ends of the levers I, which are component parts of the toggle-joint.

J is a collar or abutment, secured on the end of the spindle by a nut, K. This collar forms the abutment for the outer ends of the levers I.

L is a slide-cylinder enveloping the inner toggle-levers, and adapted to be moved back and forth by shoes fitted within the circular groove M, or by other well-known means.

N is the body of the chuck for holding female-threaded work, as shown in Fig. 1. This body is secured to the end of the spindle in any suitable manner, and is threaded externally at O.

P is a plunger or movable bottom, which fits within an annular recess, Q, in the chuck-body. This plunger is secured to the end of the rod C and is controlled thereby, as hereinafter set forth.

From the foregoing description the operation of my improvement is obviously as follows: The spindle is caused to revolve by power applied to the pulley R, secured thereto. The work to be operated upon (represented at S) is placed in engagement with the threads on the chuck-body, when by the rotation of the latter the former will be run thereon until it abuts against the plunger Q and is arrested thereby, when the work will revolve with the chuck and is ready to be operated upon by the turning or other tool. Now, when it is desired to remove the work, it is only necessary to reverse the spindle and move the cylinder L backward until it has released the toggle-joints sufficiently to allow them to be spread apart by centrifugal force, thus drawing the sleeve, and with it the rod and plunger, backward, when by grasping the work it will be readily backed off the threads of the chuck.

The operation of my improvement, when adapted for holding externally-threaded work, as shown in Fig. 2, is the same as above described in connection with that for holding internally-threaded work, but its construction is necessarily changed, and is as follows: A' is the body, adapted to be secured to a spindle, and having internal threads, B'. C' is a sleeve which fits around and is free to slide on the body. D' is a pin which passes through slots E' in the body and is secured in the sleeve. In assembling a chuck of this description the body is placed upon a spindle having a central rod, as above described, and the pin D' passed through a suitable opening in said rod, so that it will be seen that the sleeve will be connected to and controlled by this rod. The work F' is run into the body of the chuck and abuts against the sleeve.

Without the use of my improvement, on the application of the turning or other tool to the work, the latter would bind tightly against the body of the chuck, and it would require the use of a wrench to remove it; but by the use of the removable abutment the binding between it and the work is relieved when it is desired to remove the work.

Having thus fully described my invention, what I claim as new and useful is—

1. In combination with the threaded chuck-body rigidly secured upon the end of the lathe-spindle, the plunger-head resting within the chuck, the rod extending axially through the lathe-spindle and secured to said plunger-head, and the levers and their connections operating the rod, and by means of which the plunger may be moved against or away from the work, all arranged as described, and for the purpose set forth.

2. In a chuck as described, the body externally threaded to accommodate work and having an internal abutment, in combination with the rod extending axially through the lathe-spindle, the toggle-joint levers, the cylinder, and the stationary collar J, whereby the binding between the levers and cylinder is reduced to a minimum, and the latter is left free to be moved in releasing the abutment from contact with the work, substantially as specified.

In testimony whereof I affix my signature in presence of two witnesses.

JOHN W. STRONG.

Witnesses:
S. S. WILLIAMSON,
H. T. SHELTON, Jr.